(12) United States Patent
Totani et al.

(10) Patent No.: US 9,116,342 B2
(45) Date of Patent: Aug. 25, 2015

(54) VIRTUAL IMAGE DISPLAY APPARATUS

(71) Applicant: SEIKO EPSON CORPORATION, Tokyo (JP)

(72) Inventors: Takahiro Totani, Suwa (JP); Masayuki Takagi, Shiojiri (JP); Toshiaki Miyao, Matsumoto (JP); Akira Komatsu, Kamiina-gun (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 112 days.

(21) Appl. No.: 13/949,744

(22) Filed: Jul. 24, 2013

(65) Prior Publication Data

US 2014/0049833 A1 Feb. 20, 2014

(30) Foreign Application Priority Data

Aug. 17, 2012 (JP) ................................ 2012-180797

(51) Int. Cl.
*G02B 27/14* (2006.01)
*G02B 27/01* (2006.01)
(52) U.S. Cl.
CPC ...... *G02B 27/0172* (2013.01); *G02B 2027/012* (2013.01); *G02B 2027/0178* (2013.01)

(58) Field of Classification Search
CPC .............................. G02B 27/017; G02B 27/01
USPC ......................................................... 359/633
See application file for complete search history.

(56) References Cited

U.S. PATENT DOCUMENTS 6,310,728 B1 * 10/2001 Okuyama et al. ............. 359/633

FOREIGN PATENT DOCUMENTS

JP B2-4926432 5/2012

* cited by examiner

*Primary Examiner* — James Jones
(74) *Attorney, Agent, or Firm* — Oliff PLC (57) ABSTRACT

A light blocking member that is a light blocking structure disposed in an exit pupil position can remove in advance a light component of video image light that undergoes unintended reflection to avoid generation of ghost light and allows formation of a satisfactory image. Further, a projection lens and other components form an intermediate image in a prism, and the video image light totally reflected off at least two surfaces of the prism, a third surface, a first surface, and a second surface in this order, passes through the first surface and reaches an eye of a viewer, whereby the prism can be thin and the overall optical system can be compact and lightweight and provide wide angle, bright, high-performance display.

12 Claims, 7 Drawing Sheets

VIRTUAL IMAGE DISPLAY APPARATUS

BACKGROUND

1. Technical Field

The present invention relates to a virtual image display apparatus that presents video images formed by an image display device to a viewer, and particularly to a virtual image display apparatus suitable for a head-mounted display worn around the head of the viewer.

2. Related Art

A variety of optical systems incorporated in a virtual image display apparatus, such as a head-mounted display (hereinafter also referred to as HMD) worn around the head of a viewer, have been proposed (see Japanese Patent No. 4,926,432).

A virtual image display apparatus, such as an HMD, is desired to achieve further size and weight reduction and an increase in the angle of view without degradation in image quality. Further, when the entire view of the viewer is covered and only video image light is visible to the viewer, the viewer is unable to know what is going on outside and hence feels anxious. Instead, when the viewer is allowed to see the outside superimposed with video images, a new application, such as virtual reality, is created. It is therefore desired to develop a display that does not obstruct the outside view but displays it with video image light superimposed thereon. Further, to improve comfort and the exterior appearance of the viewer who wears an HMD or any other virtual image display apparatus, it is typically desirable that the shape of the apparatus is similar to that of glasses and that video image display devices are disposed sideways and separate from the face of the viewer instead of disposing them above the eyes of the viewer.

Japanese Patent No. 4,926,432 proposes an apparatus including a relay system that focuses an image displayed on an image display device in an intermediate image formation plane and particularly has a plurality of diaphragms that block part of the light flux to reduce the amounts of ghost light and flare. The diaphragms are disposed symmetrically with respect to the optical axis.

To achieve size and weight reduction of a virtual image display apparatus and further increase the angle of view thereof without a decrease in image quality, it is sometimes desired in a prism or any other member that guides video image light, for example, to make full use of a surface having an optical function even a portion close to the edge thereof. When a portion close to the edge is used, however, part of the video image light is likely to be guided in an unintended direction and form ghost light.

SUMMARY

An advantage of some aspects of the invention is to provide a virtual image display apparatus having a see-through capability that allows display of environment light and video image light superimposed on each other, being compact and lightweight while having a wide angle of view and high performance, and capable of preventing generation of ghost light.

A first virtual image display apparatus according to one aspect of the invention is a virtual image display apparatus including (a) a video image display device that produces video image light, (b) a projection lens through which the video image light from the video image display device travels and exits, and (c) a prism that biases an angular range within which a partial light flux of the video image light that is produced by a predetermined portion of the video image display device is allowed to travel in a predetermined direction, and (d) the virtual image display apparatus allows the video image light and environment light to be simultaneously visible. The apparatus further includes (e) a light blocking structure that is disposed in a plane including an exit pupil position of the projection lens in a peripheral portion separate from an optical axis of the projection lens and blocks in advance a portion of the partial light flux of the video image light that is produced by the predetermined portion and corresponds to the side where the angular range within which the partial light flux is allowed to travel in the predetermined direction is narrowed. The exit pupil position of the projection lens means a position in or adjacent to the projection lens and conjugate to an inherent exit pupil position where an eye of a viewer is placed or equivalent to the inherent exit pupil position. In the exit pupil position, all light fluxes of the video image light can be controlled.

In the virtual image display apparatus described above, when the prism is configured, for example, to have a curved surface having an asymmetrical shape, the prism can be thin with a sufficient angle of view and satisfactory image quality ensured, and a compact overall optical system is achieved. On the other hand, an angular range within which video image light can effectively travel in the prism is limited (biased) in some cases. In such a case, when there is a light component that passes through a portion outside the angular range, the light component is likely to undergo unintended reflection to contribute to generation of ghost light. In contrast, in the virtual image display apparatus described above, the light blocking structure is provided in a plane including the exit pupil position of the projection lens in a peripheral portion separate from the optical axis of the projection lens. The light blocking structure can block in advance light containing a light component passing through a portion outside a narrowed angular range within which light can travel through the prism, such as a partial light flux of the video image light from a peripheral portion of the video image display device that exits out of a portion close to the eye of the viewer, before the unnecessary light component enters the prism. In this process, since the light blocking structure performs the light blocking in a position conjugate to the position of the pupil of the eye of the viewer, a desired light component can be removed without unevenness caused by blocking the other light fluxes of the video image light that are not supposed to be blocked or a decrease in luminance caused by removing necessary light components. That is, generation of ghost light resulting from the unnecessary light component can be avoided with useful components of the video image light unblocked. Further, environment light is observable through the prism that allows see-through observation.

In a specific aspect of the invention, an optical system including the projection lens is a relay system that forms an intermediate image in the prism. In this case, forming an intermediate image allows a well-focused image to be formed even when the video image display device is disposed in a position separate from the eye, for example, in a position close to an ear, where the video image display device does not bother the viewer.

In another aspect of the invention, the light blocking structure is a light blocking member that has a circular opening part of which is blocked, is disposed in a position along the optical path of the projection lens and upstream of a lens that is part of the projection lens, and defines a range of the video image light incident on the lens that is part of the projection lens. In this case, the polarization state can be adjusted by changing the shape of the light blocking member.

In still another aspect of the invention, the light blocking structure blocks light incident on a portion of a peripheral area separate from the optical axis of the projection lens, the portion being part of a partial area along which the prism extends toward a viewer. In this case, a light component that is most likely to form ghost light can be reliably blocked.

In yet another aspect of the invention, the prism has at least three curved surfaces each of which has an asymmetrical shape; diopter at which an environment is observed through a first surface and a third surface of the plurality of surfaces that form the prism is substantially zero; each of the first surface and the third surface has a concave shape toward an observation side; and the video image light from the video image display device is totally reflected off the third surface, is totally reflected off the first surface, is reflected off the second surface, then passes through the first surface, and reaches the observation side. In this case, the prism can be thin and the overall optical system can be compact and lightweight, whereby the center of gravity of the apparatus can be close to the viewer for improvement in comfort of the viewer who wears the apparatus.

In still yet another aspect of the invention, the light blocking structure blocks in advance the video image light directed toward a surface of the prism that is adjacent to the second surface of the prism on an environment side. In this case, the light blocking structure can remove in advance a component of the video image light that is most likely to form ghost light in the prism.

In further another aspect of the invention, a half-silvered mirror is formed on the second surface and allows the video image light to be presented to a viewer, and a light transmissive member integrated with the second surface is disposed outward from the second surface and allows the environment light and the video image light superimposed on each other to be presented to the viewer with diopter at which the environment light is observed being nearly zero. In this case, the amounts of defocus and distortion of the environment light observed through the second surface can be reduced.

In still further another aspect of the invention, the light transmissive member has a first transmissive surface and a second transmissive surface on the viewer side and a third transmissive surface on the environment side; the second surface of the prism and the second transmissive surface of the light transmissive member have substantially the same curvature; and the second surface and the second light transmissive member are integrated with each other. In this case, the two surfaces can be bonded to and integrated with each other.

In yet further another aspect of the invention, the projection lens is formed of an axially symmetrical lens that has at least one asymmetrical surface.

A second virtual image display apparatus according to one aspect of the invention is a virtual image display apparatus including (a) a video image display device that produces video image light, (b) a projection lens through which the video image light from the video image display device travels and exits, (c) a prism having a surface shape that biases an angular range within which a partial light flux of the video image light that is produced by a predetermined portion of the video image display device travels in a predetermined direction, and (d) the virtual image display apparatus allows the video image light and environment light to be simultaneously visible. The apparatus further includes (e) a light blocking structure that is disposed in a plane including an exit pupil position of the projection lens in a peripheral portion separate from an optical axis of the projection lens and blocks in advance a portion of the partial light flux of the video image light that is produced by the predetermined portion and incident on a portion beyond a boundary portion of the surface shape of the prism and outside an intended optical path.

In the virtual image display apparatus described above, when the surface shape of the prism is configured, for example, to have a curved surface having an asymmetrical shape, the prism can be thin with a sufficient angle of view and satisfactory image quality ensured, and a compact overall optical system is achieved. On the other hand, an angular range within which video image light can effectively travel in the prism is limited (biased) in some cases. In such a case, when there is a light component that passes through a portion outside the angular range, the light component is likely to undergo unintended reflection to contribute to generation of ghost light. In contrast, in the virtual image display apparatus described above, the light blocking structure is provided in a plane including the exit pupil position of the projection lens in a peripheral portion separate from the optical axis of the projection lens. The light blocking structure can block in advance a light component of the video image light that is incident on a portion beyond the boundary portion of the surface shape of the prism and outside the intended optical path, such as a partial light flux of the video image light from a peripheral portion of the video image display device that exits out of a portion close to the eye of the viewer, before the light component enters the prism. In this process, since the light blocking structure performs the light blocking in a position conjugate to the position of the pupil of the eye of the viewer, a desired light component carne removed without unevenness caused by blocking the other light fluxes of the video image light that are not supposed to be blocked or a decrease in luminance caused by removing necessary light components. That is, generation of ghost light resulting from the unnecessary light component can be avoided with useful components of the video image light unblocked. Further, environment light is observable through the prism that allows see-through observation.

In a specific aspect of the invention, the prism has at least three curved surfaces that form the surface shape, each of the curved surfaces having an asymmetrical shape; diopter at which an environment is observed through a first surface and a third surface of the plurality of surfaces that form the prism is substantially zero, each of the first surface and the third surface has a concave shape toward an observation side; the video image light from the video image display device is totally reflected off the third surface, is totally reflected off the first surface, is reflected off the second surface, then passes the first surface, and reaches the observation side; and the light blocking structure blocks in advance the video image light directed toward the third surface, which is a portion beyond the boundary portion between the second surface and the third surface and outside the intended optical path in the reflection process off the second surface. In this case, the prism can be thin for improvement in comfort of the viewer who wears the apparatus, and even when the optical path of the video image light is limited as a result of the thin prism, the light blocking structure can remove in advance a component of the video image light that is most likely to form ghost light in the prism.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A virtual image display apparatus according to a first embodiment of the invention will be described below in detail with reference to the drawings.

A. Exterior Appearance of Virtual Image Display Apparatus

Figure 1:
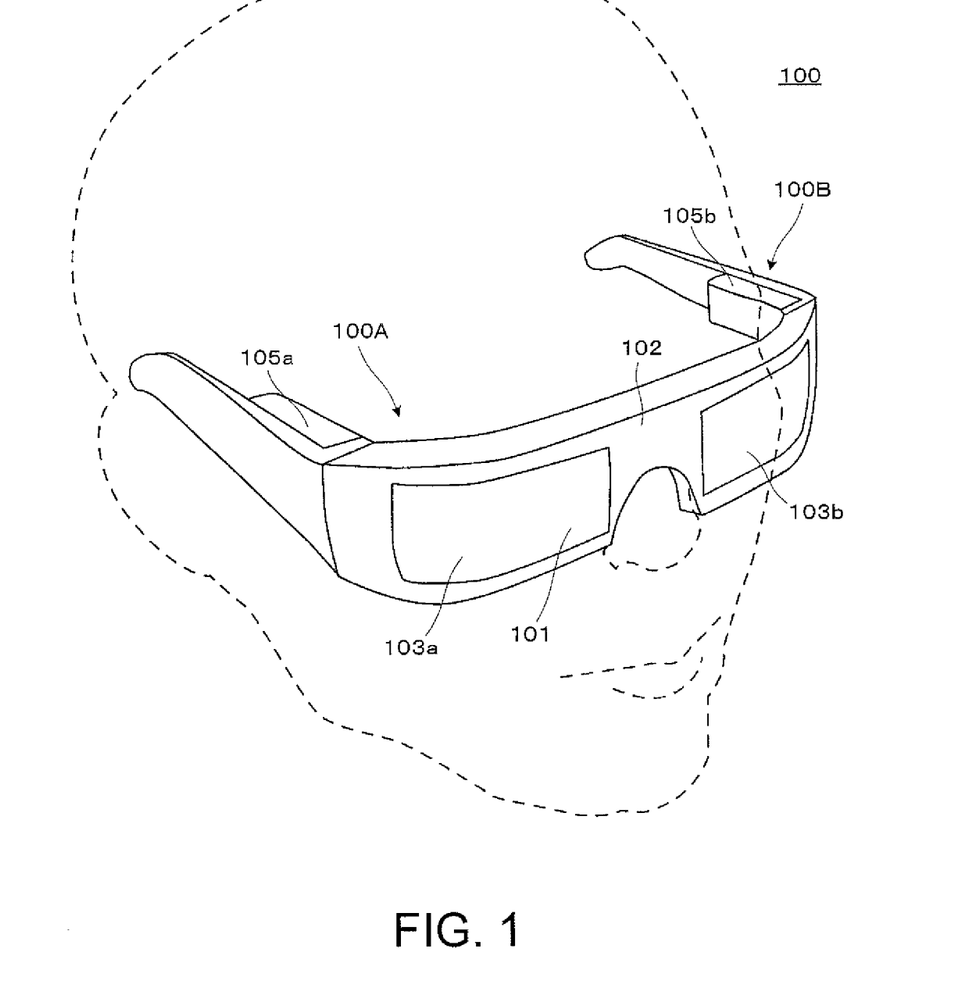
FIG. 1 is a perspective view for describing the exterior appearance of a virtual image display apparatus according to a first embodiment.

A virtual image display apparatus 100 according to the present embodiment shown in FIG. 1 is a head-mounted display having a glasses-like exterior appearance and allows a viewer who wears the virtual image display apparatus 100 not only to visually recognize image light in the form of a virtual image but also to experience see-through visual recognition or observation of an environment image. The virtual image display apparatus 100 includes a see-through member 101, which covers an area in front of the eyes of the viewer, a frame 102, which supports the see-through member 101, and a first built-in device 105a and a second built-in device 105b, which are added to sidepiece portions (temples) behind cover portions at the right and left ends of the frame 102. The see-through member 101 is a thick, curved optical member that covers an area in front of the eyes of the viewer (transmissive eye cover) and divided into a first optical portion 103a and a second optical portion. 103b. A first display unit 100A, which is a combination of the first optical portion 103a and the first built-in device 105a on the left side in FIG. 1, is a portion that forms a virtual image for the right eye and functions by itself as a virtual image display apparatus. Similarly, a second display unit 100B, which is a combination of the second optical portion 103b and the second built-in device 105b on the right side in FIG. 1, is a portion that forms a virtual image for the left eye and functions by itself as a virtual image display apparatus.

B. Structure of Display Unit

Figure 2:
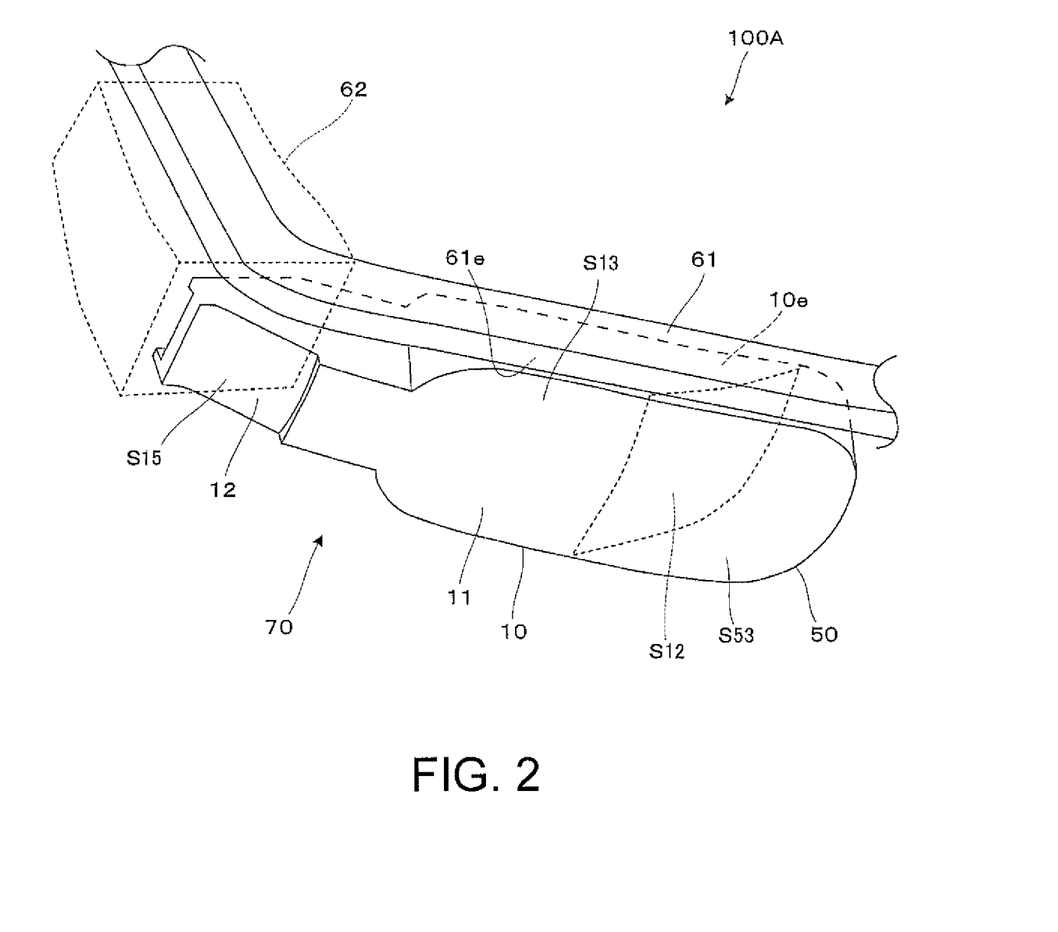
FIG. 2 is a perspective view for describing a body structure of the virtual image display apparatus.
Figure 3A:
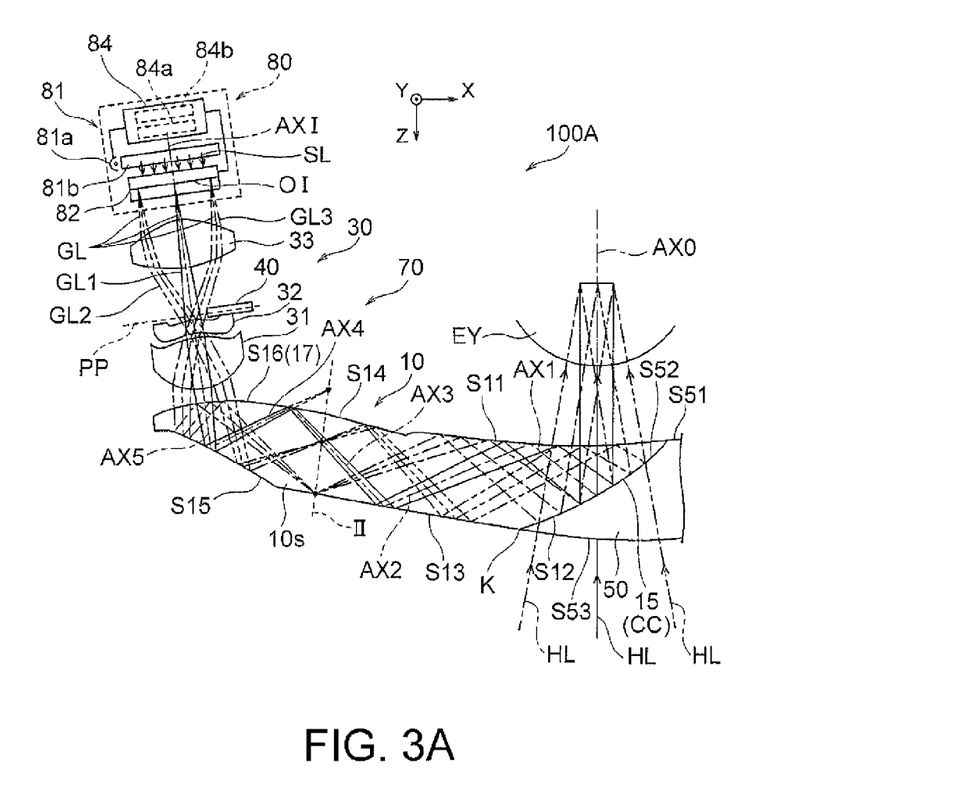
FIG. 3A is a cross-sectional plan view of a body portion of a first display unit that forms the virtual image display apparatus.
Figure 3B:
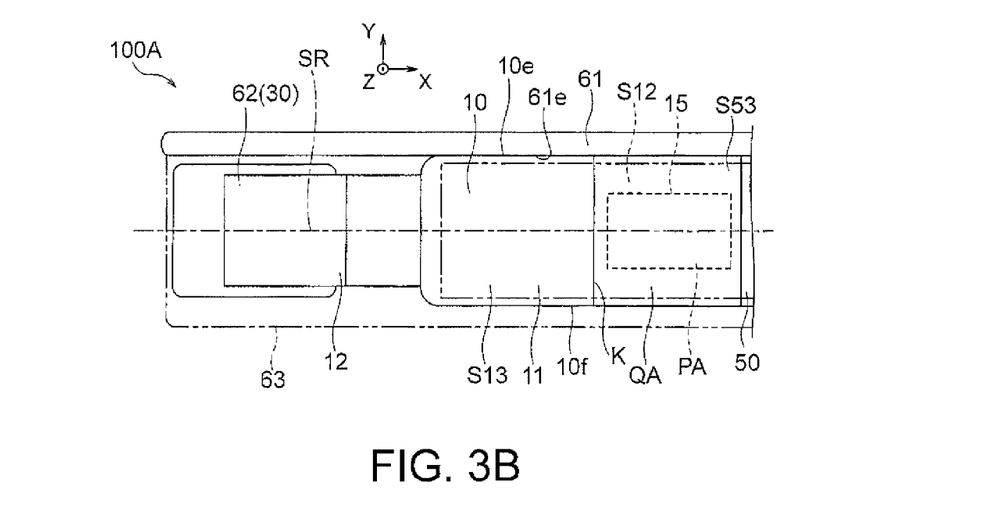
FIG. 3B is a front view of the body portion.

The first display unit 100A includes a projection and see-through section 70 and an image display section 80, as shown in FIGS. 2, 3A, and 3B. The projection and see-through section 70 includes a prism 10, which is a light guide member, a light transmissive member 50, a projection lens 30 for image formation, and a light blocking member 40, which is a light blocking structure that blocks part of video image light. The prism 10 and the light transmissive member 50 are bonded into an integrated member, which are so firmly fixed to the lower side of a frame 61 that an upper surface 10e of the prism 10 and a lower surface 61e of the frame 61 are in contact with each other. The projection lens 30 is fixed to an end of the prism 10 via a lens barrel 62, which accommodates the projection lens 30. Among the components of the projection and see-through section 70, the prism 10 and the light transmissive member 50 correspond to the first optical portion 103a in FIG. 1, and the projection lens 30 in the projection and see-through section 70 and the image display section 80 correspond to the first built-in device 105a in FIG. 1. The second display unit 100E shown in FIG. 1 has the same structure as that of the first display unit 100A but simply has a horizontally reversed structure, and no detailed description of the second display unit 100B will therefore be made.

Among the components in the projection and see-through section 70, the prism 10 is an arcuate member curved along the face of the viewer in a plan view and can be considered as a combination of a first prism portion 11 on the central side close to the nose and a second prism portion 12 on the peripheral side shifted away from the nose. The first prism portion 11 is disposed on the light exiting side and has a first surface S11, a second surface S12, and a third surface S13 as side surfaces each having an optical function, and the second prism portion 12 is disposed on the light incident side and has a fourth surface S14, a fifth surface S15, and a sixth surface S16 as side surfaces each having an optical function. The side surfaces described above are disposed as follows: The first surface S11 and the fourth surface S14 are adjacent to each other; the third surface S13 and the fifth surface S15 are adjacent to each other; the second surface S12 is disposed between the first surface S11 and the third surface S13; and the sixth surface S16 is disposed between the fourth surface S14 and the fifth surface S15. Further, the prism 10 has a first side surface 10e and a second side surface 10f adjacent to the first to sixth surfaces S11 to S16 and facing with each other.

The surfaces of the prism 10 are shaped as follows: The first surface S11 is a free-form surface formed around a light exiting-side optical axis AXO parallel to a Z axis; the second surface S12 is a free-form surface formed around an optical axis AX1 extending in a reference surface SR, which is parallel to an XZ plane, and inclined to the Z axis; the third surface S13 is a free-form surface formed around the light exiting-side optical axis AXO; the fourth surface S14 is a free-form surface formed around the bisector of a pair of optical axes AX3 and AX4 extending in the reference surface SR, which is parallel to the XZ plane, and inclined to the Z axis; the fifth surface S15 is a free-form surface formed around the bisector of a pair of optical axes AX4 and AX5 extending in the reference surface SR, which is parallel to the XZ plane, and inclined to the Z axis; and the sixth surface S16 is a free-form surface formed around the optical axis AX4 extending in the reference surface SR, which is parallel to the XZ plane, and inclined to the Z axis. Each of the first to sixth surfaces S11 to S16 described above has a shape symmetrical in a vertical (or up-down) Y-axis direction with respect to the reference surface SR, which extends horizontally (or in right-left direction) and is parallel to the XZ plane and along which the optical axes AX1 to AX5 and other lines extend.

The prism 10 is made of a resin material having high light transmittance in the visible region and formed by injecting such a thermoplastic resin into a die and allowing the resin to solidify. A body portion 10s of the prism 10 is an integrally formed portion but can be considered as a combination of the first prism portion 11 and the second prism portion 12. The first prism portion 11 not only allows video image light GL to travel and go out of the prism 10 but also allows environment light HL to pass through. The second prism portion 12 allows the video image light GL to enter and travel.

In the first prism portion 11, the first surface S11 not only functions as a refraction surface that causes the video image light GL to go out of the first prism portion 11 but also functions as a total reflection surface that totally reflects the video image light GL off the inner side thereof. The first surface S11 is disposed in front of an eye EY and has a concave shape toward the viewer. The body portion 10s can be coated with a hard coat layer in order to prevent the first surface S11 from being damaged and the resolution of video images from decreasing. The hard coat layer is formed by depositing a coat agent made, for example, of a resin on a foundation surface of the body portion 10s in a dipping or spray coating process.

The second surface S12 has a half-silvered mirror layer 15. The half-silvered mirror layer 15 is a reflection film that partially transmits light (semi-transmissive reflection film). The half-silvered mirror layer (semi-transmissive reflection film) 15 does not occupy the entire second surface S12 but is formed on a partial area PA. That is, the half-silvered mirror layer 15 is formed on the partial area PA, which is primarily narrower in the vertical direction than an overall area QA, over which the second surface S12 extends. In more detail, the partial area PA is disposed in a central portion of the overall area QA in the vertical Y-axis direction and substantially occupies the entire area of the overall area QA in the direction along the horizontal reference plane SR. The half-silvered mirror layer 15 is formed by forming a metal reflection film or a dielectric multilayer film on the partial area PA of the foundation surface of the body portion 10s. The reflectance at which the half-silvered mirror layer 15 reflects the video image light GI, incident on the half-silvered mirror layer 15 at an angle of incidence within an estimated range is set at a value greater than or equal to 10% but smaller than or equal to 50% considering that see-through observation of the environment light HL is readily made. In a specific example, the reflectance at which the half-silvered mirror layer 15 reflects the video image light GL is set, for example, at 20%, and the transmittance at which the half-silvered mirror layer 15 transmits the video image light GL is set, for example, at 80%.

The third surface S13 functions as a total reflection surface that totally reflects the video image light GL off the inner side thereof. The third surface S13 can be coated with a hard coat layer in order to prevent the surface from being damaged and the resolution of video images from decreasing. The third surface S13 is disposed in front of the eye EY and has a concave shape toward the viewer as the first surface S11, and when the viewer observes the environment light HL having passed through the first surface S11 and the third surface S13, the diopter is substantially zero.

In the second prism portion 12, each of the fourth surface S14 and the fifth surface S15 functions as a total reflection surface that totally reflects the video image light GL off the inner side thereof or functions as a reflection surface when coated with a mirror layer 17. When each of the fourth surface S14 and the fifth surface S15 is configured to function as a total reflection surface, the body portion 10s can be coated with a hard coat layer in order to prevent the surface from being damaged and the resolution of video images from decreasing.

The sixth surface S16 functions as a refraction surface that causes the video image light GL to enter the second prism portion 12. The body portion 10s can be coated with a hard coat layer in order to prevent the sixth surface S16 from being damaged and the resolution of video images from decreasing. Alternatively, an antireflection film 17 can be coated in place of the hard coat layer or in addition thereto.

As described above, the first surface S11 to the sixth surface S16 form the contour shape formed of the surfaces of the prism 10, in particular, guide the video image light GL. Conversely, the first surface S11 to the sixth surface S16 restrict the range within which the video image light GL can be delivered to the viewer, that is, an allowable angular range of the incident light and hence bias the angular range. In the present embodiment, in particular, since each of the surfaces S11 to S16 of the prism 10 is a curved surface having a shape asymmetrical with respect to the video image light GL, the way in which the video image light GL is guided through the prism 10 is asymmetrical depending on the position where the video image light GL exits out of the image display section. Specifically, for example, the portions that form the video image light GL are defined as follows: Light components that exit out of a central portion of the image display section 80 form a first partial light flux GL1; light components that exit out of a peripheral portion of the image display section 80 that is away from the viewer (or half-silvered mirror layer 15) form a second partial light flux GL2; and light components that exit out of a peripheral portion of the image display section 80 that is close to the viewer (or half-silvered mirror layer 15) form a third partial light flux GL3. The partial light fluxes GL1, GL2, and GL3 have different angular ranges within which they can travel through the prism 10. The third partial light flux GL3, for example, is likely to contain light components that do not fall within the angular range or are not allowed to travel through the prism 10. In particular, when the third partial light flux GL3 travels via a boundary portion K between the second surface S12 and the third surface S13, the light components out of the angular range are likely to undergo unintended reflection. That is, in FIG. 3A, an area around the boundary portion K most restricts the angular range of the video image light GL. If the light components described above travel through the prism 10, ghost light can be disadvantageously produced.

The projection lens 30 is held in the lens barrel 62, and the image display section 80 is fixed to one end of the lens barrel 62. The second prism portion 12 of the prism 10 is connected to the lens barrel 62, which holds the projection lens 30, and indirectly supports the projection lens 30 and the image display section 80. The light incident side of the prism 10 along with the projection lens 30 and other components is covered with a cover member 63, which prevents external light from entering the prism 10. The cover member 63 also covers the upper end or the lower end of the prism 10. An additional light blocker that prevents external light from entering the prism 10 can be provided around the prism 10. The light blocker can, for example, be formed of a light blocking paint or a light scattering layer.

The projection lens 30 includes, for example, three lenses 31, 32, and 33 arranged along a light incident-side optical axis AXI. Each of the lenses 31, 32, and 33 is an axially symmetrical lens, and at least one of them has an aspheric surface. The projection lens 30 allows the video image light GL having exited out of the image display section 80 to enter the prism 10 through the sixth surface S16 of the prism 10, in which the video image light GL is focused again. That is, the projection lens 30 is a relay system for refocusing the video image light or image light in the prism 10 after having exited from each point on an image plane OI of a video image display device 82. It is noted that the surfaces of the prism 10, which cooperate with the projection lens 30, function as part of the relay system.

In the projection lens 30, which is formed of the three lenses 31, 32, and 33, an exit pupil position PP, where the diameter of the light flux is minimized, is located in a position between the lens 32 and the lens 33, which are located in positions shifted toward the image display section 80. That is, the partial light fluxes GL1, GL2, and GL3 are substantially superimposed on each other in the exit pupil position PP, as shown in FIG. 3A. It is noted that an exit pupil position in the virtual image display apparatus 100 should inherently be a position where the eye EY is placed. The exit pupil position PP in FIG. 3A is conjugate to the exit pupil position in the eye EY of the viewer. That is, the exit pupil position PP is a projection-side exit pupil position and located in a position equivalent to the inherent exit pupil position. The state of the video image light GL to be incident on the eye EY of the viewer can therefore be controlled by controlling light blocking in the exit pupil position PP.

The light blocking member 40 is, for example, a light absorbing, plate-shaped member painted in black and disposed in the exit pupil position PP described above in the projection lens 30. Further, the light blocking member 40, which is disposed in the exit pupil position PP, extends from a position close to the eye EY of the viewer (+X side) toward the optical axis AXI, which is the optical axis of the projection lens 30, and blocks light components in part of a peripheral portion of the video image light GL separate from the optical axis AXI, specifically, part of a partial area along which the prism 10 extends toward the viewer. That is, the light blocking member 40, which is disposed in the projection lens 30 or in a position adjacent thereto, functions as a light blocking structure that blocks part of the video image light GL. More specifically, the light blocking member 40 blocks, for example, only part of the third partial light flux GL3 of the video image light GL passing through the projection lens 30, specifically, components passing through a portion close to the viewer, which corresponds to a peripheral portion of the image display section 80. The thus configured light blocking member 40 removes in advance light components that are contained in the third partial light flux GL3 and likely to form ghost light. In this process, the light blocking member 40, which is disposed in the exit pupil position PP, which is conjugate to the pupil position of the eye FY and where the partial light fluxes are substantially superimposed on each other, can efficiently remove light components resulting in ghost light without unevenness caused by nonuniformly blocking the other light fluxes of the video image light GL or a decrease in luminance caused by removing necessary light components.

The light transmissive member 50 is fixed to and integrated with the prism 10. The light transmissive member 50 is a member that aids the see-through capability of the prism 10 (auxiliary prism) and has a first transmissive surface S51, a second transmissive surface S52, and a third transmissive surface S53 as side surfaces each having an optical function. The second transmissive surface S52 is disposed in a position between the first transmissive surface S51 and the third transmissive surface S53. The first transmissive surface S51 is located along a curved plane that is an extension of the first surface S11 of the prism 10. The second transmissive surface S52 is a curved surface bonded to and integrated with the second surface S12 via a bonding layer CC. The third transmissive surface S53 is located along a curved plane that is an extension of the third surface S13 of the prism 10. The second transmissive surface S52 and the second surface S12 of the prism 10, which are bonded to and integrated with each other, have substantially the same curvature.

The light transmissive member (auxiliary prism) 50 is made of a thermoplastic resin material showing high light transmittance in the visible region and having a refractive index substantially equal to the refractive index of the body portion 10s of the prism 10.

The image display section 80 includes an illuminator 81, which outputs two-dimensional illumination light SL, a video image display device 82, which is a transmissive spatial light modulator, and a drive controller 84, which controls the operation of the illuminator 81 and the video image display device 82.

The illuminator 81 in the image display section 80 includes a light source 81a, which emits light containing three color light fluxes of red, green, and blue light fluxes, and a backlight guide 81b, which diffuses the light from the light source 81a into a light flux having a rectangular cross-sectional shape. The video image display device 82 is formed, for example, of a liquid crystal display device and spatially modulates the illumination light SL from the illuminator 81 to form image light to be displayed, such as motion images. The drive controller 84 includes a light source drive circuit 84a and a liquid crystal drive circuit 84b. The light source drive circuit 84a supplies the light source 81a in the illuminator 81 with electric power to allow the light source 81a to emit the illumination light SL having stable luminance. The liquid crystal drive circuit 84b outputs an image signal or a drive signal to the video image display device 82 to cause it to form color image light in the form of a transmittance pattern based on which motion images or still images are formed. An image processing capability can be added to the liquid crystal drive circuit 84b, or an external control circuit can be provided with an image processing capability.

C. Optical Path of Video Image Light and Other Light

The optical path of the video image light GL and other light in the virtual image display apparatus 100 will next be described.

The video image light GL having exited out of the video image display device 82 converges through the projection lens 30 and impinges on the sixth surface S16, which is a surface of the prism 10 and has relatively large positive power.

The video image light GL having passed through the sixth surface S16 of the prism 10 travels while converging and passes through the second prism portion 12, where the video image light GL is reflected off the fifth surface S15, which has relatively small positive power, and then reflected off the fourth surface S14, which has relatively small negative power.

The video image light GL reflected off the fourth surface S14 of the second prism portion 12 enters the first prism portion 11, where the video image light GL is incident on the third surface S13, which has relatively small positive power, and totally reflected off the third surface S13, and the video image light GL is then incident on the first surface S11, which has relatively small negative power, where the video image light GL is totally reflected. It is noted that the video image light GL forms an intermediate image in the prism 10 before or after the video image light GL travels via the third surface S13. An image plane II of the intermediate image corresponds to the image plane OI of the video image display device 82 but is reversed by the third surface S13.

The video image light GL totally reflected off the first surface S11 is incident on the second surface 812, and the video image light GL incident on the half-silvered mirror layer 15, in particular, partially passes through the half-silvered mirror layer 15 and is partially reflected off the half-silvered mirror layer 15. The partially reflected video image light GL is incident on the first surface S11 again and passes therethrough. The half-silvered mirror layer 15 acts as a component having relatively large positive power on the video image light GL to be reflected off the half-silvered mirror layer 15. The first surface S11 acts, on the other hand, as a component having negative power on the video image light GL passing through the first surface S11.

The video image light GL having passed through the first surface S11 and forming a substantially parallelized light flux is incident on the pupil of the eye EY of the viewer. That is, the video image light GL in the form of a virtual image allows the viewer to observe the image formed on the video image display device 82.

On the other hand, a portion of the environment light HL that is incident on an area of the prism 10 that is next to the second surface S12 on the −X side passes through the third surface S13 and the first surface S11 of the first prism portion 11. In this process, the positive power and the negative power of the two surfaces are canceled with each other and aberrations are corrected at the same time. That is, the viewer observes an environment image that is not greatly distorted through the prism 10. Similarly, a portion of the environment light HL that is incident on an area of the prism 10 that is next to the second surface S12 on the +X side, that is, a portion of the environment light HL that is incident on the light transmissive member 50, passes through the third transmissive surface S53 and the first transmissive surface S51 of the light transmissive member 50. In this process, the positive power and the negative power of the two surfaces cancel with each other and aberrations are corrected at the same time. That is, the viewer observes an environment image that is not greatly distorted through the light transmissive member 50. Further, a portion of the environment light HL that is incident on the light transmissive member 50 facing the second surface S12 of the prism 10 passes through the third transmissive surface S53 and the first surface S11. In this process, the positive power and the negative power of the two surfaces cancel with each other and aberrations are corrected at the same time. That is, the viewer observes an environment image that is not greatly distorted through the light transmissive member 50. The second surface S12 of the prism 10 and the second transmissive surface S52 of the light transmissive member 50 have substantially the same curved shape and substantially the same refractive index, and the gap between the two surfaces is filled with the bonding layer CC having a refractive index substantially equal to those of the second surface S12 and the second transmissive surface S52. That is, neither the second surface S12 of the prism 10 or the second transmissive surface S52 of the light transmissive member 50 acts as a refraction surface on the environment light HL.

However, since the environment light HL incident on the half-silvered mirror layer 15 partially passes through the half-silvered mirror layer 15 and is partially reflected off the half-silvered mirror layer 15 at the same time, the environment light HL incident in the direction facing the half-silvered mirror layer 15 is attenuated in accordance with the transmittance of the half-silvered mirror layer 15. On the other hand, since the video image light GL travels in the direction facing the half-silvered mirror layer 15, the viewer observes an environment image as well as the image formed on the video image display device 82 in the direction toward the half-silvered mirror layer 15.

The video image light GL having traveled through the prism 10 and impinged on the second surface S12 but not having been reflected off the half-silvered mirror layer 15 enters the light transmissive member 50, but an antireflection portion (not shown) provided in the light transmissive member 50 prevents the incident video image light from returning into the prism 10. That is, the video image light GL having passed through the second surface S12 is not allowed to return back to the optical path or form stray light. Further, the environment light HL incident through the light transmissive member 50 and reflected off the half-silvered mirror layer 15 returns into the light transmissive member 50, but the antireflection portion (not shown) provided in the light transmissive member 50 described above prevents the environment light from entering the prism 10. That is, the environment light HL reflected off the half-silvered mirror layer 15 is not allowed to return back to the optical path or form stray light.

Figure 4:
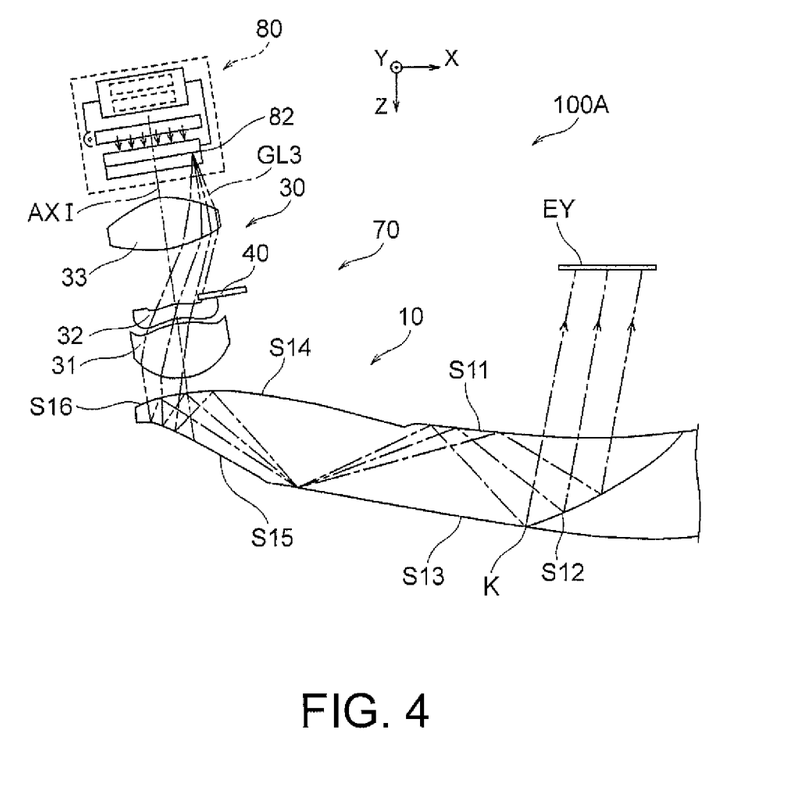
FIG. 4 is a cross-sectional view for describing optical surfaces and optical paths in a prism in the first display unit.

Consider now one of the partial light fluxes of the video image light GL, for example, the third partial light flux GL3 produced at the peripheral portion separate from the center of the image display section 80, as shown in FIG. 4. Light components of the third partial light flux GL3 that exit from a portion separate from the optical axis AXI in a direction parallel to the XZ plane (that is, parallel to reference plane SR) and perpendicular to the optical axis AXI are partially blocked in advance by the light blocking member 40, and the remainder travels through the prism 10. The light adjustment described above prevents the third partial light flux GL3 from being reflected off in an unintended direction in the prism 10 or contributing to generation of ghost light but allows only light components to be effectively used to exit through the light blocking member 40. As shown in FIG. 4, the third partial light flux GL3 is guided through the prism 10 as follows: The third partial light flux GL3 is incident on the sixth surface S16, travels via the fifth surface S15, the fourth surface 814, and the third surface S13, is totally reflected off the first surface S11, and then incident on the second surface S12 via the first surface S11. The area of the second surface S12 that is used in this process includes a portion close to the boundary between the second surface 812 and the third surface 813. That is, restricting the second surface S12 to a smaller area results in a narrower angular range within which the third partial light flux GL3 is used in image formation. In the process in which the third partial light flux GL3 is incident on the second surface S12, if there are light components incident on the third surface S13, which is a portion beyond the boundary portion K and outside the intended optical path, the light components are likely to be reflected in an unintended direction and recognized as ghost light. In the present embodiment, generation of ghost light is avoided by using the light blocking member 40 to remove in advance light components of the third partial light flux GL3 outside the narrowed angular range within which the third partial light flux GL3 is used in image formation. In other words, the light blocking member 40 forms a light blocking structure that prevents in advance light components that should be incident on the second surface S12 (including half-silvered mirror layer 15), which is one of the surfaces of the prism 10 that bias the angular range within which the video image light GL, which is incident light, is used in image formation, from being incident on the third surface S13, which is a portion beyond the boundary portion K.

Figure 5:
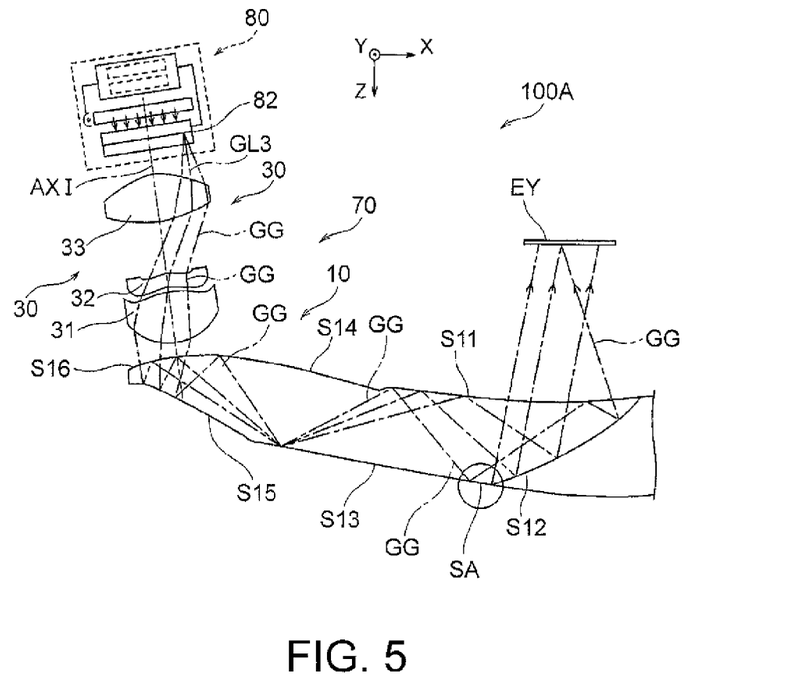
FIG. 5 is a cross-sectional view for describing optical surfaces and optical paths in a prism in Comparative Example.

In contrast, when no light blocking member 40 is disposed, an outermost component GG of the third partial light flux GL3 that exits from an outermost portion of the video image display device 82 enters the prism 10 and travels therethrough, as in Comparative Example shown in FIG. 5. The component GG undergoes unintended reflection unlike the other light components as shown in FIG. 5, contributing to generation of ghost light. Follow now a specific optical path along which the component GG is guided in the prism 10. The light component GG is incident on the sixth surface S16, travels via the fifth surface S15, the fourth surface S14, and the third surface S13, is further totally reflected off the first surface S11, and is then supposed to be directed from the first surface S11 toward the second surface S12. The light component GG, however, is not incident on the second surface S12 but is incident on a surface beyond the boundary portion K and adjacent to the second surface S12 on the environment side, that is, on part of the third surface S13, which is outside the intended optical path, or a surface portion SA close to the second surface S12, and is reflected in an unintended direction. After reflected off the surface portion SA, the light component GG is totally reflected off the first surface S11 again, is directed toward and reflected off the second surface S12, and exits through the first surface S11. As a result, the light component GG that exits at an exit angle different from an inherent exit angle of the third partial light flux GL3 reaches the eye EY of the viewer and is recognized by the viewer as ghost light. In contrast, in the present embodiment, the light blocking member 40 provided as described above removes the light component GG and other unwanted light components before they are incident on the prism 10. That is, the light blocking performed in advance by the light blocking member 40 avoids the situation shown in FIG. 4 in which light components that should undergo final reflection off the second surface S12 before exiting out of the prism 10 and should be used in image formation are incident on the third surface S13, which is a portion beyond the boundary portion K and outside the intended optical path, undergoes unintended reflection to form ghost light.

As described above, in the virtual image display apparatus 100 according to the present embodiment, the light blocking member 40, which is disposed in a plane including the exit pupil position PP in a peripheral portion shifted from the optical axis AXI, can remove in advance part of the video image light or the light component GG, which undergoes unintended reflection as described above, whereby generation of ghost light is avoided and a satisfactory image can be formed. Further, in the virtual image display apparatus 100, since the projection lens 30 and other components form an intermediate image in the prism 10, and the video image light GL totally reflected off at least two surfaces, specifically, the third surface S13, the first surface S11, and the second surface S12 in this order, passes through the first surface S11 and reaches the eye EY of the viewer, the prism 10 can be thin and hence the overall optical system can not only be compact and lightweight but also provide a wide angle of view and high-performance display. Moreover, the environment light HL can be observed after it passes, for example, through the first surface S11 and the third surface S13. Since the diopter in the environment light observation is nearly zero, the amounts of defocus and distortion of the environment light HL in the see-through observation thereof can be reduced. Further, the shape of the prism 10 follows the face of the viewer with the center of gravity of the prism 10 being close to the face, providing an excellent exterior appearance. The second display unit 100B (see FIG. 1) for the left eye, which has a horizontally reversed structure, is likely to produce ghost light in the direction opposite to the direction described above, which can be removed in advance in the same manner described above.

The distance between the first surface S11 and the third surface S13 of the prism 10 is set at a value greater than or equal to 5 mm but smaller than or equal to 15 mm. The inclination angle of the second surface S12 to the first surface S11 is set at a value greater than or equal to 20° but smaller than or equal to 40°.

Further, the width of the first surface S11 of the prism 10 in the X direction is set, for example, at a value greater than or equal to 10 mm but smaller than or equal to 30 mm. Further, the inclination angle of the second surface S12 to the third surface S13 is set at a value, for example, greater than or equal to 140° but smaller than or equal to 160°.

The fourth surface S14 and the fifth surface S15 of the prism 10, which are provided to adjust the optical path and more precisely correct aberrations, can be omitted in consideration of the specifications and other factors of the projection and see-through section 70.

In the above description, the half-silvered mirror layer 15 is provided on the second surface S12. The half-silvered mirror layer 15 can be replaced with a hologram formed on the second surface S12 for image formation. In this case as well, the light blocking member 40 prevents in advance light components that should be incident on the second surface S12 on which a hologram is formed from being incident on the third surface S13, which is a portion beyond the boundary portion K and outside the intended optical path, to form ghost light.

Figure 6:
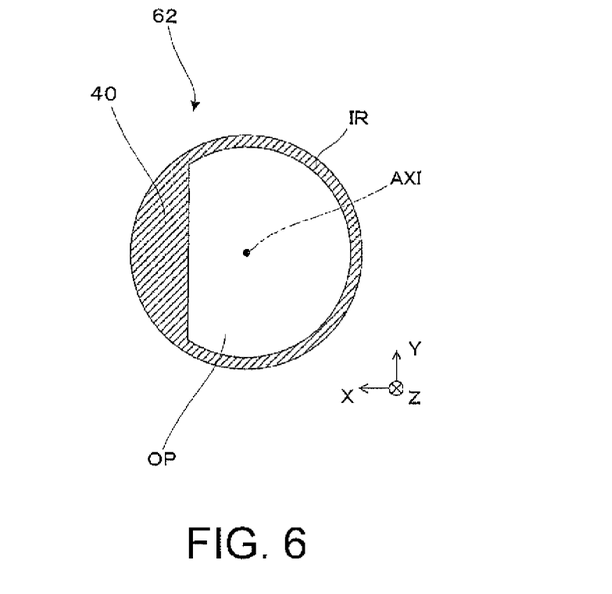
FIG. 6 describes a light blocking structure according to a variation.

FIG. 6 describes a light blocking member 40 according to a variation. In the above description, the light blocking member 40, which is a light blocking structure, is a single plate-shaped member. The light blocking member 40, which is a light blocking structure according to the present embodiment, is not limited thereto but may be a member provided as part of the lens barrel 62 shown in FIG. 2 and other figures and having an opening through which light passes and which has a shape deformed from a cylindrical symmetrical shape. Specifically, the light blocking member 40 may be provided as part of the lens barrel 62 and so formed that part of a circular hole provided in the position of an aperture stop and having a circular opening shape is filled, as shown in FIG. 6. In this case, the light blocking member 40 is so attached that part of the aperture stop TR having an annular shape and provided as part of the lens barrel 62 is blocked, and the resultant opening OP is so shaped that part of the circular shape symmetrical with respect to the optical axis AXI is filled in accordance with a necessary light blocking area, or the resultant opening OP forms a hole having a shape asymmetrical with respect to the optical axis AXI in the horizontal direction (X direction). In this case, the light blocking member 40 is disposed along the optical path in a position upstream of the lens 33, which is part of the projection lens 30, defines the range of the video image light GL incident on the lens 33, and hence has a function of a light blocking structure.

Further, the light blocking structure, such as the light blocking member 40, can alternatively be a variety of other structures or implemented by a variety of other methods. For example, a lens portion through which light to be blocked passes may be truncated. Further, the light blocking member 40 is not necessarily so painted in black that it absorbs light but may, for example, diffuse light as long as no stray light is newly produced or other problems occur.

Second Embodiment

A virtual image display apparatus according to a second embodiment will be described below. The virtual image display apparatus according to the present embodiment is a variation of the virtual image display apparatus 100 according to the first embodiment and similar to the virtual image display apparatus 100 except the structure of the projection and see-through section 70, and no overall description will therefore be made.

Figure 7:
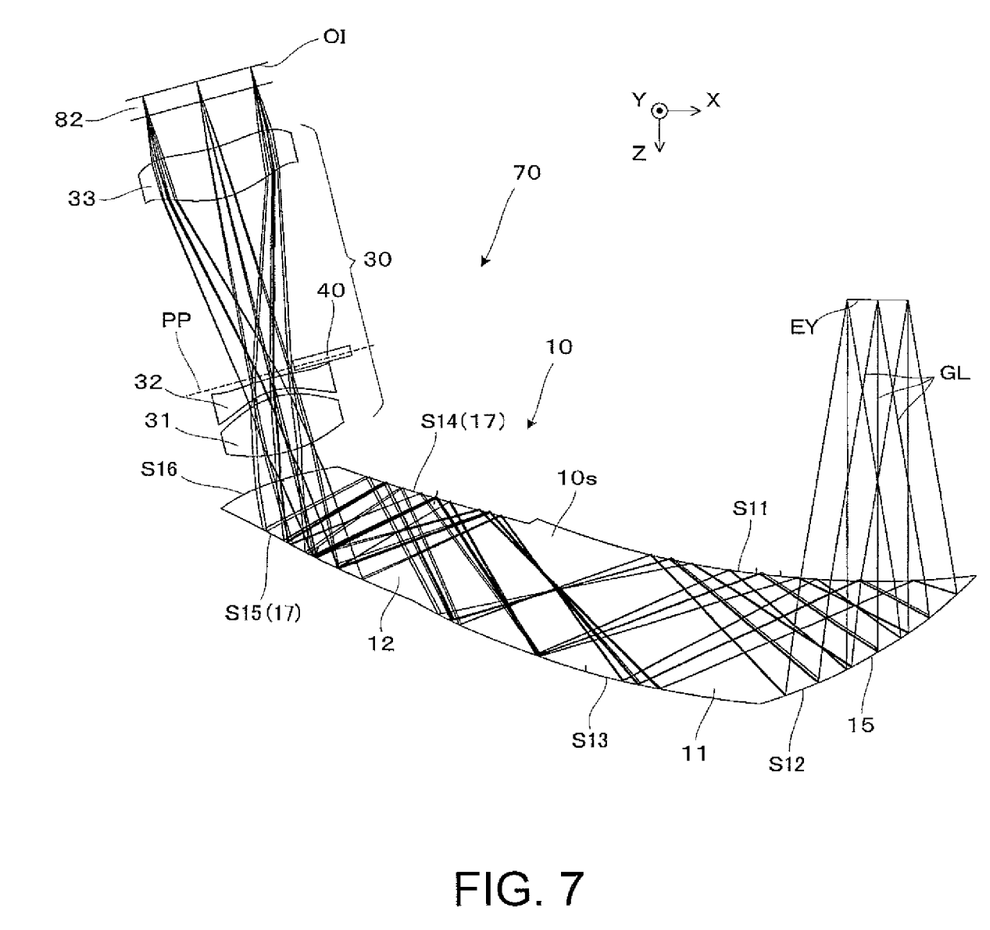
FIG. 7 describes a virtual image display apparatus according to a second embodiment.

FIG. 7 is a cross-sectional view of a projection and see-through section 70 that forms the virtual image display apparatus according to the present embodiment. A prism 10 in the projection and see-through section 70 has a first surface S11 having small negative power, a second surface S12 having relatively large positive power, a third surface S13 having relatively small positive power, a fourth surface S14 having relatively small negative power, a fifth surface S15 having relatively small positive power, and a sixth surface 516 having relatively large positive power, as shown in FIG. 7. A projection lens 30 includes a lens 31 having positive power, a lens 32 having negative power, and a lens 33 having positive power.

A light blocking member 40 is disposed in a plane including the exit pupil position PP between the lens 32 and the lens 33, which are part of the lenses that form the projection lens 30, in a peripheral portion separate from the optical axis AXI. That is, in the present embodiment as well, even when the shapes and the degrees of power of the surfaces S11 to S16 of the prism 10 and the lenses 31 to 33, which form the projection lens 30, differ from those in the first embodiment, disposing the light blocking member 40 in a plane including the exit pupil position PP in a peripheral portion separate from the optical axis AXI removes in advance light components in the prism 10 that are supposed to be incident on the second surface S12 but actually incident on the third surface S13 and reflected in an unintended direction to avoid generation of ghost light, whereby a satisfactory image can be formed.

Third Embodiment

A virtual image display apparatus according to a third embodiment will be described below. The virtual image display apparatus according to the present embodiment is a variation of the virtual image display apparatus 100 according to the first embodiment and similar to the virtual image display apparatus 100 except the structure of the projection and see-through section 70, and no overall description will therefore be made.

Figure 8:
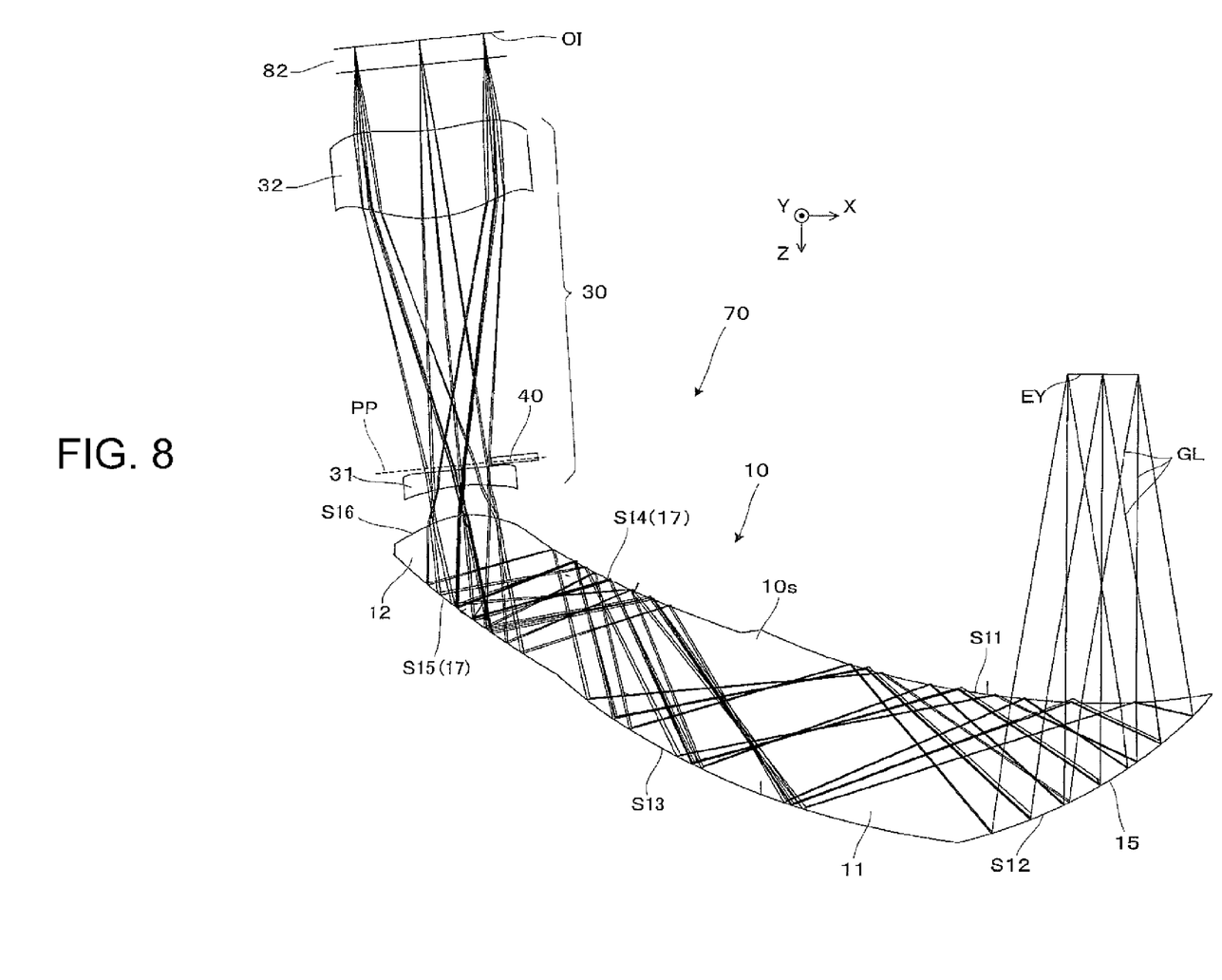
FIG. 8 describes a virtual image display apparatus according to a third embodiment.

FIG. 8 is a cross-sectional view of a projection and see-through section 70 that forms the virtual image display apparatus according to the present embodiment. A prism 10 in the projection and see-through section 70 has a first surface S11 having small negative power, a second surface S12 having relatively large positive power, a third surface S13 having relatively small positive power, a fourth surface S14 having relatively small negative power, a fifth surface S15 having relatively small positive power, and a sixth surface S16 having relatively large positive power, as shown in FIG. 8. A projection lens 30 includes a lens 31 having negative power and a lens 32 having positive power. That is, the projection lens 30 is formed of the two lenses.

The light blocking member 40 is disposed in a plane including the exit pupil position PP between the lens 31 and the lens 32, which form the projection lens 30, in a peripheral portion separate from the optical axis AXI. That is, in the present embodiment as well, even when the shapes of the surfaces of the prism 10 and the number of lenses that form the projection lens 30 differ from those in the first embodiment and other embodiments, disposing the light blocking member 40 in a plane including the exit pupil position PP in a peripheral portion separate from the optical axis AXI removes in advance light components in the prism 10 that are supposed to be incident on the second surface S12 but actually incident on the third surface S13 and reflected in an unintended direction to avoid generation of ghost light, whereby a satisfactory image can be formed.

Others

The invention has been described with reference to the above embodiments, but the invention is not limited thereto. The invention can be implemented in a variety of other aspects to the extent that they do not depart from the substance of the invention. For example, the following variations are conceivable.

In the above description, the light blocking member 40 is disposed in the exit pupil position PP of the projection lens 30. However, the light blocking member 40 is not necessarily disposed exactly in the exit pupil position PP as long as light components to be blocked can be removed and the other useful light components are not greatly affected. For example, the light blocking member 40 can be disposed in a position substantially close to the exit pupil position PP but slightly shifted toward the video image display device 82. In this case, however, it is necessary, for example, not to block more than necessary, for example, light components that exit out of a portion of the video image light GL that is slightly closer to the central optical axis AXI than the third partial light flux GL3.

In the above description, the half-silvered mirror layer (semi-transmissive reflection film) 15 is formed in a horizontally elongated rectangular area. The contour of the half-silvered mirror layer 15 can, however, be changed as appropriate in accordance with an application of interest and other usages. Further, the transmittance and reflectance of the half-silvered mirror layer 15 can be changed in accordance with an application of interest and other factors.

In the above description, the luminance distribution of an image displayed on the video image display device 82 is not particularly adjusted. When the luminance differs position to position, for example, the luminance distribution of a displayed image can be nonuniformly adjusted.

In the above description, the image display section 80 includes the video image display device 82 formed of a transmissive liquid crystal display device. The image display section 80 does not necessarily include the video image display device 82 formed of a transmissive liquid crystal display device but can alternatively be any of a variety of other devices. For example, the image display section 80 can alternatively include a reflective liquid crystal display device, or the video image display device 82 formed of a liquid crystal display device can be replaced, for example, with a digital micromirror device. Further, the image display section 80 can be a self-luminous device, representative examples of which include an LED array and an OLED (organic EL display).

The above description has been made of the virtual image display apparatus 100 including a pair of display units 100A and 100B, and the pair of display units 100A and 100B can be replaced with a single display unit. That is, instead of providing each of the right and left eyes with a set of the projection and see-through section 70 and the image display section 80, only one of the right and left eyes may be provided with the projection and see-through section 70 and the image display section 80 for monocular image vision.

In the above description, the distance between the pair of display units 100A and 100B in the X direction has not been described. The distance between the display units 100A and 1003 is not necessarily fixed but can be adjusted, for example, by using a mechanical mechanism. That is, the distance between the display units 100A and 100B in the X direction can be adjusted in accordance with the interpupillary distance of the wearer and other factors.

In the above description, the virtual image display apparatus 100 is assumed to be a head-mounted display for specific description. The virtual image display apparatus 100 can alternatively be modified into a head-up display. Further, the virtual image display apparatus 100 can be used in a finder optical system.

In the above description, each of the first surface S11 and the third surface S13 of the prism 10 does not have a mirror, a half-silvered mirror, or any other optical component formed thereon but the interface between the surface and air totally reflects and guides video image light. The total reflection in the virtual image display apparatus 100 according to the embodiments of the invention also includes reflection based on a mirror coating or a half-silvered mirror film formed on the entirety or part of the first surface S11 or the third surface S13. For example, the total reflection includes a case where substantially the entire image light is reflected off a mirror coating or any other optical component provided on the entirety or part of the first surface S11 or the third surface S13 described above with the angle of incident of the image light satisfying the total reflection condition. Further, the entirety or part of the first surface S11 or the third surface S13 may be coated with a mirror having a certain small degree of transmittance provided that sufficiently bright image light is provided.

In the above description, the prism 10 and other components extend in the right-left direction along which the eyes EY are arranged. The prism 10 can alternatively be so disposed that it extends in the up-down direction. In this case, the optical member 101 has a structure in which the components thereof are arranged in parallel to each other instead of being arranged in series.

The entire disclosure of Japanese Patent Application No. 2012-180797, filed Aug. 17, 2012 is expressly incorporated by reference herein.

What is claimed is:

1. A virtual image display apparatus that allows video image light and environment light to be simultaneously visible, the apparatus comprising:
    a video image display device that produces the video image light;
    a projection lens through which the video image light from the video image display device travels and exits;
    a prism that transmits in a predetermined direction a portion of a light flux of the video image light that is within a range of incident angles; and
    a light blocking structure that is disposed in a plane including an exit pupil position of the projection lens in a peripheral portion separate from an optical axis of the projection lens and blocks a portion of the light flux that corresponds to a side of the prism where the range of incident angles is narrowed.

2. The virtual image display apparatus according to claim 1,
    wherein an optical system including the projection lens is a relay system that forms an intermediate image in the prism.

3. The virtual image display apparatus according to claim 1,
    wherein the light blocking structure (i) is a light blocking member that has a circular opening, part of which is blocked, (ii) is disposed in a position along the optical path of the projection lens and upstream of a lens that is part of the projection lens, and (iii) defines a range of the video image light incident on the lens that is part of the projection lens.

4. The virtual image display apparatus according to claim 1,
    wherein the light blocking structure blocks light incident on a portion of a peripheral area separate from the optical axis of the projection lens, the portion being part of a partial area along which the prism extends toward a viewer.

5. The virtual image display apparatus according to claim 1,
    wherein the prism has at least three curved surfaces each of which has an asymmetrical shape,
    a diopter at which an environment is observed through a first surface and a third surface of the plurality of surfaces that form the prism is substantially zero,
    each of the first surface and the third surface has a concave shape toward an observation side, and
    the video image light from the video image display device is totally reflected off the third surface, is totally reflected off the first surface, is reflected off the second surface, then passes through the first surface, and reaches the observation side.

6. The virtual image display apparatus according to claim 5,
    wherein the light blocking structure blocks a portion of the light flux directed toward a surface of the prism that is adjacent to the second surface of the prism on an environment side.

7. The virtual image display apparatus according to claim 5,
    wherein a half-silvered mirror is formed on the second surface and allows the video image light to be presented to a viewer, and
    a light transmissive member integrated with the second surface is disposed outward from the second surface and allows the environment light and the video image light superimposed on each other to be presented to the viewer with a diopter at which the environment light is observed being nearly zero.

8. The virtual image display apparatus according to claim 7,
    wherein the light transmissive member has a first transmissive surface and a second transmissive surface on the viewer side and a third transmissive surface on the environment side,
    the second surface of the prism and the second transmissive surface of the light transmissive member have substantially the same curvature, and
    the second surface and the second light transmissive surface are integrated with each other.

9. The virtual image display apparatus according to claim 1,
    wherein the projection lens is formed of an axially symmetrical lens that has at least one asymmetrical surface.

10. A virtual image display apparatus that allows video image light and environment light to be simultaneously visible, the apparatus comprising:
    a video image display device that produces the video image light;
    a projection lens through which the video image light from the video image display device travels and exits;
    a prism having a surface shape that transmits in a predetermined direction a portion of a light flux of the video image light that is within a range of incident angles; and
    a light blocking structure that is disposed in a plane including an exit pupil position of the projection lens in a peripheral portion separate from an optical axis of the projection lens and blocks a portion of the light flux incident on a portion beyond a boundary portion of the surface shape of the prism and outside an intended optical path.

11. The virtual image display apparatus according to claim 10,
    wherein the prism has at least three curved surfaces that form the surface shape, each of the curved surfaces having an asymmetrical shape,
    a diopter at which an environment is observed through a first surface and a third surface of the plurality of surfaces that form the prism is substantially zero,
    each of the first surface and the third surface has a concave shape toward an observation side,
    the video image light from the video image display device is totally reflected off the third surface, is totally reflected off the first surface, is reflected off the second surface, then passes the first surface, and reaches the observation side, and
    the light blocking structure blocks a portion of the light flux directed toward the third surface, which is the portion beyond the boundary portion between the second surface and the third surface and outside the intended optical path in the reflection process off the second surface.

12. The virtual image display apparatus according to claim 3, wherein the partially blocked circular opening has a shape that is asymmetrical with respect to the optical axis in a horizontal direction, and is symmetrical with respect to the optical axis in a vertical direction.

* * * * *